(12) United States Patent
Fischer et al.

(10) Patent No.: US 7,996,119 B2
(45) Date of Patent: Aug. 9, 2011

(54) METHOD FOR DETERMINING THE POSITION OF A SPACECRAFT WITH THE AID OF A DIRECTION VECTOR AND AN OVERALL SPIN MEASUREMENT

(75) Inventors: Horst-Dieter Fischer, Unterhaching (DE); Joachim Chemnitz, Munich (DE)

(73) Assignee: Astrium GmbH, Munich (DE)

( * ) Notice: Subject to any disclaimer, the term of this patent is extended or adjusted under 35 U.S.C. 154(b) by 0 days.

(21) Appl. No.: 12/852,603

(22) Filed: Aug. 9, 2010

(65) Prior Publication Data

US 2011/0022309 A1    Jan. 27, 2011

Related U.S. Application Data

(62) Division of application No. 10/939,994, filed on Sep. 14, 2004, now Pat. No. 7,797,085.

(30) Foreign Application Priority Data

Sep. 15, 2003 (DE) .................. 103 42 866

(51) Int. Cl.
*G01C 21/02* (2006.01)
*G01C 21/24* (2006.01)

(52) U.S. Cl. .................... 701/3; 701/226; 244/158.4

(58) Field of Classification Search ............. 701/3, 226; 244/158.4
See application file for complete search history.

(56) References Cited

U.S. PATENT DOCUMENTS

| | | |
|---|---|---|
| 3,866,025 A | 2/1975 | Cavanagh |
| 4,358,076 A | 11/1982 | Lange et al. |
| 4,504,912 A | 3/1985 | Bruderle et al. |
| 4,725,024 A | 2/1988 | Vorlicek |
| 4,752,884 A | 6/1988 | Slafer et al. |
| 4,757,964 A | 7/1988 | McIntyre |
| 5,020,744 A | 6/1991 | Schwarzschild |
| 5,042,752 A | 8/1991 | Surauer et al. |
| 5,058,835 A | 10/1991 | Goodzeit et al. |
| 5,080,307 A | 1/1992 | Smay et al. |

(Continued)

FOREIGN PATENT DOCUMENTS

DE     693 09 015 T2     7/1997

(Continued)

OTHER PUBLICATIONS

NASA News Release. Relativity mission achieves two major milestones. For release: Feb. 28, 2002. Release # 02-043. Downloaded: Nov. 3, 2006. http://www.msfc.nasa.govinews/news/releases/2002/02-043.html.

(Continued)

*Primary Examiner* — Mark Hellner
*Assistant Examiner* — Ari M. Diacou
(74) *Attorney, Agent, or Firm* — Crowell & Moring LLP

(57) ABSTRACT

In a system for determining the position of a spacecraft based on vector determinations, a direction vector is measured in a body-fixed coordinate system; a reference direction vector is determined within a reference coordinate system based on the path position of the spacecraft and an orbit model; the overall spin vector of the spacecraft is determined within the body-fixed coordinate system; and a reference overall spin vector of the spacecraft is determined within a reference coordinate system by time propagation of known initial values of the overall spin of the spacecraft or by time tracking of a reference model. The position of the spacecraft is determined based on the four vectors.

4 Claims, 1 Drawing Sheet

U.S. PATENT DOCUMENTS

| | | | |
|---|---|---|---|
| 5,222,023 A | 6/1993 | Liu et al. | |
| 5,255,879 A | 10/1993 | Yocum et al. | |
| 5,279,483 A | 1/1994 | Blancke et al. | |
| 5,433,402 A | 7/1995 | Surauer et al. | |
| 5,452,869 A | 9/1995 | Basuthakur et al. | |
| 5,826,828 A | 10/1998 | Fowell et al. | |
| 5,931,421 A | 8/1999 | Surauer et al. | |
| 5,996,941 A | 12/1999 | Surauer et al. | |
| 6,000,661 A | 12/1999 | Price et al. | |
| 6,019,320 A | 2/2000 | Shah et al. | |
| 6,282,467 B1 | 8/2001 | Shah et al. | |
| 6,311,932 B1 | 11/2001 | Rodden et al. | |
| 6,347,262 B1 | 2/2002 | Smay et al. | |
| 6,577,929 B2 | 6/2003 | Johnson et al. | |
| 7,806,369 B2 * | 10/2010 | Kawaguchi | 244/158.4 |
| 2002/0121573 A1 | 9/2002 | Vandenbussche et al. | |

FOREIGN PATENT DOCUMENTS

| | | |
|---|---|---|
| DE | 696 06 275 T2 | 7/2000 |
| EP | 0 603 058 B1 | 6/1994 |
| EP | 0 785 132 A1 | 7/1997 |
| EP | 0 790 542 B1 | 8/1997 |
| GB | 2 360 099 A | 9/2001 |

OTHER PUBLICATIONS

Science@NASA. A Pocket of Near-Perfection. Apr. 26, 2004. Downloaded: Nov. 3, 2006. htto://science.nasa.gov/headlines/v2004/26apr_gpbtech.html.

W.W. Hansen Experimental Physics Lab at Stanford University. The Shaping of Gravity Probe B. Downloaded: Nov. 3, 2006. http://einstein.stanford.edu/content/story_of_gpb/gpbsty4.html.

Wikipedia, the free encyclopedia. Basic introduction to the mathematics of curved spacetime. Revision as of 06:07, Oct. 21, 2006. Downloaded: Nov. 3, 2006 http://en.wikipedia.org/w/index.php?title=Basic_introduction_to_the_mathematics_of_curved_spacetime&o Idid=82770013&printable=yes.

Spacecraft Attitude Determination and Control. By James Richard Wertz, J.R. Wertz (Editor), 876 pp. Publisher: Reidel. Pub. Date: Dec. 1978. pp. 410-435 cited.

Vogt, Jay D. Attitude Determination of a Three-Axis Stabilized Spacecraft Using Star Sensors. Thesis: Naval Postgraduate school. Monterery, CA. Report Date: Dec. 1999, 86 Pages. Downloaded from: http://stint.dtic.mil/cgi-bin/GetTRDoc?AD=AD374426&Location=U2@doc=GetTRDoc.pdf.

T.C. Helvey (Ed.) Space Traiectories. Copyright 1960, by Academic Press. pp. 45-46.

* cited by examiner

METHOD FOR DETERMINING THE POSITION OF A SPACECRAFT WITH THE AID OF A DIRECTION VECTOR AND AN OVERALL SPIN MEASUREMENT

CROSS REFERENCE TO RELATED APPLICATIONS

This is a divisional application of U.S. patent application Ser. No. 10/939,994, filed on Sep. 14, 2004, which claims the priority of German patent document 103 42 866.6, filed Sep. 15, 2003, the disclosures of which are expressly incorporated by reference herein.

BACKGROUND AND SUMMARY OF THE INVENTION

The invention concerns a method for determining the position of a spacecraft based on two vector determinations, wherein sensor data and spin data are determined as output variables for determining the position.

In known stabilization systems, a spacecraft, outfitted with an earth sensor (for direction measurement) and spin wheels that generate a spin target value, can be stabilized around all 3 axes (Whecon principle). The methods employed by such systems make use of the dynamic coupling between rolling and yawing induced by the spin target value in order to stabilize the spacecraft either directly, by correspondingly selected actuator control (jets or wheels), or by using an observer to determine the missing position information (as a rule, the yaw position).

European patent document EP 0 786 132, for example, explains the Whecon principle, on the one hand, and a method for determining the position of a spacecraft as well, in which a decoupling of the individual factors that act upon the spacecraft takes place. Hence, decoupling terms are determined there in order to obtain a decoupling of the roll-yaw coupling terms. This nonetheless represents a relatively high computing expenditure.

U.S. Pat. No. 6,282,467A discloses a method and apparatus for determining the position of a spin-stabilized spacecraft in an inertial reference system. The following steps are carried out: the determination of a spin vector direction in the inertial reference system, based on measured data (in particular the sensor data); the determination of a spin vector in a body-fixed reference system, based on known inertial data; the determination of a direction vector based on single axis sensor data; the determination of a reference direction vector with the aid of an ephemeris model; and the determination of the position of the spacecraft based on the mentioned four vectors and the propagation of the position utilizing sensor data. This method cannot be applied for three axis stabilized spacecraft, and requires in addition a relatively large number of known input variables and sensor data.

It is therefore an object of the present invention to provide a simplified and improved method for determining the position of a spacecraft, in particular a three axis stabilized spacecraft.

This and other objects and advantages are achieved by the method and apparatus for determining the position of a spacecraft according to the invention, based on the determination of direction vectors and spin vectors. Sensor data and spin data are determined as initial variables for determining position, and

- a direction vector in a body-fixed coordinate system is measured with the aid of a sensor, as a first vector determination;
- a reference direction vector within a reference coordinate system based on the path position of the spacecraft and an orbit model is determined as a second vector;
- the overall spin vector of the spacecraft in the body-fixed coordinates system is determined as a third vector; and
- the reference overall spin vector of the spacecraft within a reference coordinate system is determined by time propagation of known initial values of the overall spin of the spacecraft or by way of a time tracking of a reference model for the overall spin as a fourth vector.

The position of the spacecraft is determined based on the four vectors.

This method is simpler than the known method according to the state of the art, since utilizing the knowledge of an initial value of the overall spin eliminates the necessity, on the one hand, for an expensive determination of decoupling terms; and, on the other hand, the individual detection steps for determining the position are simplified, as explained below. In particular, basically only one single single-axis vector measurement with the aid of a sensor is necessary, namely for the measurement of the direction vector in a body-fixed coordinate system.

The overall spin can be determined, for example, as a deviation with respect to a reference overall spin. The reference overall spin can be determined, on the one hand, by time propagation of known initial values of the overall spin. For this purpose a measurement or estimate of the overall spin at a specific initial point in time is also required. But the reference overall spin can also be determined by way of a time tracking of a reference model of an overall spin. This corresponds basically to the method of using an observer, which his known in principle from the state of the art. The reference direction vector can be determined basically also (similarly to the reference overall spin) either by time propagation of known initial values of the direction vector or through a time tracking of a reference model of the direction vector.

In one embodiment of the method according to the invention, first of all the rate of rotation or a component of the rate of rotation between a body-fixed coordinate system and the reference coordinate system is determined as an intermediate step of a position determination. In this manner the longitudinal rate component of the speed of rotation or the speed of rotation vector in the direction of the direction vector between the body-fixed coordinate system and the reference coordinate system is first determined based on at least the direction vector, the reference direction vector, and an overall spin that is time-propagated or time-tracked by means of a reference model. The overall spin can moreover be used in a suitable representation, for example, in an orbit coordinate system. With the aid of the longitudinal rate component, the overall spin vector is determined in the body-fixed coordinate system. A transformation matrix that describes the deviations of the actual position of the body-fixed coordinate system of the spacecraft from the target position of the body-fixed coordinate system is determined based on the direction vector, the reference direction vector, the overall spin vector, and the reference overall spin vector; that is, a transformation matrix of the deviations of the actual position of the body-fixed coordinate system of the spacecraft is determined by the reference coordinate system. The reference coordinate system thus represents the target position of the body-fixed coordinate system. The overall spin was utilized again for this method step, so that only the knowledge on the direction vector and on the overall spin is necessary for the overall position determination, which essentially simplifies the method. In addition, in the last method step, the overall spin according to direction and magnitude is not required. The direction of the overall spin alone suffices.

In addition, at least the direction vector and the reference direction vector in particular are used to determine the overall spin vector in the body-fixed coordinate system.

The overall spin is basically determined by whether the spacecraft has spin wheels whose wheel spin constitutes a basic component of the overall spin. The previously described method can be carried out in connection with a spacecraft with spin wheels, even without an explicit measurement of wheel spin. The speed of rotation or components of the speed of rotation can also be determined based on the estimated values or measured values of the wheel spin. Particularly the determination of the longitudinal rate component and the determination of the overall spin vector can occur in addition based on the determined spin vector of spin wheels of the spacecraft.

The method can be carried out in an especially advantageous manner if the deviations of the actual position from the target position are small. This applies in particular when the angle deviations $\tilde{\phi}^-_{BR}$ are smaller than 0.1 wheel in the transformation matrix $T^{BR}=1-\tilde{\phi}^-_{BR}$ are less than 0.1 radius.

An arrangement for determining the position of a spacecraft has the following components:
- a device for measuring a direction vector in a body-fixed coordinate system;
- a device for determining the path position of the spacecraft;
- an arrangement for determining a reference direction vector in a reference coordinate system based on the path position of the spacecraft and an orbit model;
- a device for determining an overall spin vector in the body-fixed coordinate system;
- an arrangement for determining a reference overall spin vector in the reference coordinate system; and
- a device for determining the position of the spacecraft based of the four vectors.

The aforementioned arrangements can moreover consist of one or more functional components. Such an arrangement serves in particular to implement the method described above, and achieves advantages and possibilities already mentioned.

A further embodiment of the invention has, in addition: a device for determining the longitudinal rate component of the speed of rotation (or, the speed of rotation vector in the direction of the direction vector) between the body-fixed coordinate system and the reference coordinate system Moreover, the invention may also include an apparatus for measuring or estimating the spin vector of spin wheels of the spacecraft.

Other objects, advantages and novel features of the present invention will become apparent from the following detailed description of the invention when considered in conjunction with the accompanying drawings.

BRIEF DESCRIPTION OF THE DRAWING

The single FIGURE of the drawing illustrates a block diagram of the invention.

DETAILED DESCRIPTION OF THE DRAWINGS

Figure 1:
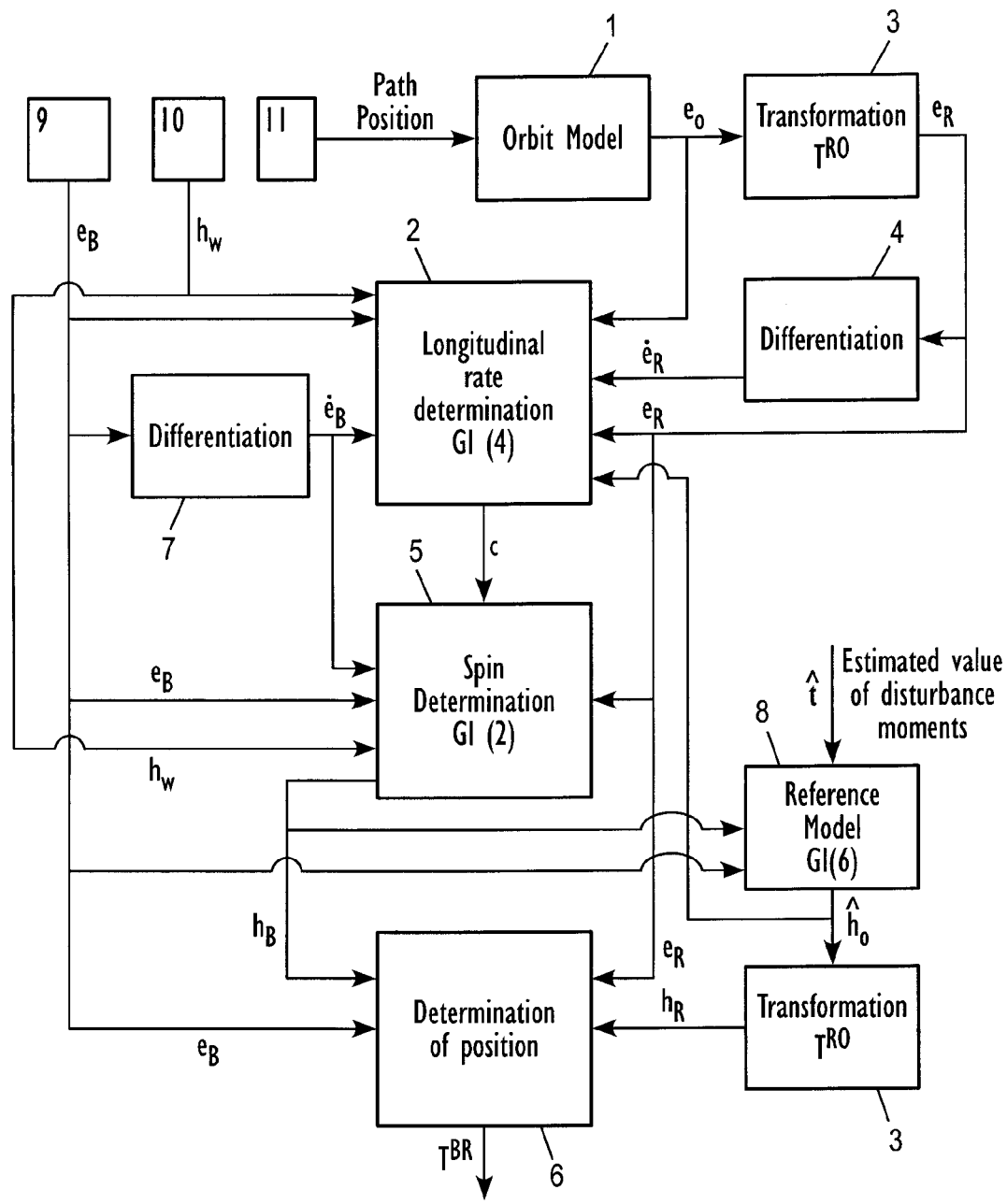

The following relationships are used for derivation of the method according to the invention:
The speed of rotation between the body-fixed and reference coordinate system $$\omega_{BR}=\tilde{e}_B\dot{e}_B+ce_B+T^{BR}\tilde{e}_R\dot{e}_R \quad (1)$$

wherein
$e_B=T^{BR}e_R$: is the unit vector (UV) of the direction measurement in the body-fixed system (that is, the direction vector obtained from the direction vector measurement),
$e_R$: is the associated UV in the reference coordinate system with the additional property that the associated direction in the inertial system is variable over time (that is, the reference direction factor obtained from the reference direction vector measurement),
$T^{BR}=I-\tilde{\phi}_{BR}$: is the transformation matrix of the small deviations between the body-fixed and the reference coordinate system to be determined, which also corresponds to the deviation of the overall spin from the reference overall spin,
$\phi_{BR}$: is the vector of small angles that describe the deviation between body-fixed and reference system,
"~": is the cross product operation, and
$c=e_B^T\omega_{BR}$: is the speed of rotation component to be determined in the direction of $e_B$, called "longitudinal rate" below.

The spin vector in body-fixed coordinate system $$h_B = J_s\begin{pmatrix} \omega_{BR} + \\ T^{BR}\omega_{RI} \end{pmatrix}h_w \approx J_s[-\tilde{e}_B\dot{e}_B + ce_B + \tilde{e}_R\dot{e}_R - \tilde{\phi}_{BR}(\omega_{RI} + \tilde{e}_R\dot{e}_R)] + J_s\omega_{RI} + h_w \approx J_s\begin{pmatrix} -\tilde{e}_B\dot{e}_B + \\ \tilde{e}_R\dot{e}_R + ce_B \end{pmatrix} + h_s \quad (2)$$

since $\phi_{BR}$ is small,
wherein:
$J_s$: is the inertia moment matrix of the spacecraft,
$\omega_{RI}$: is the speed of rotation of the reference system with respect to the inertial system, and
hw: is the spin component stored in the spin wheels (=wheel spin).

The speed of rotation component c is calculated first. Since the angle between the measured and reference vectors is independent from the coordinate system selected, the following applies:

$$e_B^Th_B=e_R^Th_R=e_0^Th_0 \quad (3)$$

wherein $$h_R=T^{RO}h_0$$

and wherein
$T^{RO}$: is the transformation matrix between the reference and orbit system, which describes the target position of the spacecraft and is generally specified via blow values that can also be time variable,
$h_0$: is the spin of the spacecraft in the orbit system assumed as known,
$e_0$: is the measuring direction in the orbiting system, known from the orbit data.
Based on (3) follows directly the third line with (1) and (2)

$$c = \frac{e_0^Th_0 - e_B^T(h_s - J_s\tilde{e}_B\dot{e}_B + J_S\tilde{e}_R\dot{e}_R)}{e_B^TJ_se_B} \quad (4)$$

Since the term $J_2(\omega_{RI}+\tilde{e}_R\dot{e}_R)$ remains small with respect to $h_w$ due to the selection of the wheel spin, the term $J_s\tilde{\phi}\phi_{BR}(\omega_{RI}+\tilde{e}_R\dot{e}_R)$ of second order is small, wherewith $h_w$ of practically independent of $\tilde{\phi}_{BR}$ and consequently of $T^{BR}$.

In addition to determining $h_B$ via c in accordance with equation (2), (4) offers alternatively the use of an observer or a Kalman filter that utilizes the vector $h_B$ reduced by the term with the unknown c as a measured variable. The equations for this read:

$$(aa) h_m = J_s(-\tilde{e}_B \dot{e}_B + \tilde{e}_R \dot{e}_R) + h_s$$

$$(bb) \hat{\omega}_{BI} = J_S^{-1}(z - h_W)$$

$$(cc) \dot{z} + [/\$]\$\hat{\ }\$\$[/\$]\$\hat{\ } A\hat{T}[/\$]\$\hat{\ } g \hat{q}_{BI} z = K(h_m - z) \quad (2a)$$

wherein z is the estimate vector for $h_B$, and

K is the amplification matrix, for example the "Kalman" amplification.

In both cases, the sought matrix $T^{BR}$ can be determined from the vector pairs $e_B/e_n$ and $h_b/h_n$ or $z/h_R$ with one of the generally known methods.

There exist therefore position and speed deviations with respect to the reference system wherewith the spacecraft can be oriented in a known manner by switching in these two components on the actuators in reference to the reference system.

To explain the practical procedure an earth-oriented spacecraft on a circular orbit is considered. The simple relationship applies for the orbit spin $h_0$ $$\dot{h}_0 = -\tilde{\omega}_0 h_0 + t_s^{(0)} \quad (5)$$

wherein $$\omega_0 = \begin{pmatrix} 0 \\ w_o \\ 0 \end{pmatrix}$$

$t_s^{(0)}$: are outer moments for the spacecraft, expressed in the orbit system.

As already mentioned, two techniques may be used to determine $h_{(0)}t$:

(a) The propagation in accordance with equation (5): For this purpose a segment-wise optical 3-axis reference, for example of a sun sensor is necessary, in order to estimate the unknown components in $t_s^{(0)}$ (for example, sun disturbance moments) during these phases and to initialize $h_0$ at the end of these phases to an initial value, (b) The tracking of a reference model for $h_0$: For this purpose the following calculations are performed:

$$[/\$]\$\hat{\ }\$\$[/\$]\$\hat{\ } A\hat{P} \hat{h}_{01} = -w_0 \hat{h}_{03} + K_1 (h_{03} - \hat{h}_{03}) + \hat{t}_1$$

$$[/\$]\$\hat{\ }\$\$[/\$]\$\hat{\ } A\hat{P}_{03} = -w_0 \hat{h}_{01} + K_3 (h_{03} - \hat{h}_{03}) + \hat{t}_3 \quad (6)$$

wherein $h_{03} = e_B^T h_B$: since $e_0 = e_3$ in connection with earth reference, $\hat{h}_{oi}$ is an estimate of $h_0$, $K_j$: are switching-in values, for example, $K_1 = 3w_0$, $K_3 = |w_0|$, and $\hat{t}_i$: are estimated values of $t_{si}^{(0)}$.

Equation (6) ensures that for $t_{si}^{(0)} = \hat{t}_i$, the estimates $\hat{h}_{oi}$ converge toward $h_{oi}$. This is the case after one orbit for the indicated values of $K_1$. The missing second component of $\hat{h}_0$ is calculated in accordance with $$\hat{h}_{02} = (h_B^T h_B - (e_B^T h_B)^2 - \hat{h}_{01}^2)^{1/2} \cdot \text{sign} w_0$$

that is, the nominal wheel spin $h_w$ is selected such that the second component of its transformation in the orbit system has the same sign as the orbit rate $w_0$.

One essential advantage of the method according to the invention is that, independently of target orientation with respect to the orbit system (for example, in so-called yaw steering), which is also time variable, all calculation steps remain unaltered, since only the matrix $T^{RO}$ is correspondingly selected. In the previously known method mentioned earlier, extensive calculations must be included for compensation terms or even a time-variable dynamic of the observer. Furthermore, various types of sensors (for example, earth sensors, magnetometers) can be used as sensors.

These advantages make it possible to use the method according to the invention in all classes of spacecraft (LEO, MEO, GEO).

The FIGURE is a block diagram of a representative embodiment for realization of the method described herein:

Based on a known path position of the spacecraft (for example, through time propagation of initial values for the position of the spacecraft, and a position change over time, ideally taking into consideration external disturbances, by tracking a path model or by internal or external measurements of the spacecraft position, such as GPS) determined with the aid of a path position device 11, the reference unit vector $e_0$ is determined using a stored orbit model in a first orbit model device 1. The latter information is then fed to a device 2 for determining the longitudinal rate, in order to determine c in accordance with equation (4). The device 2 also receives transformed unit vectors $e_R$ (which is transformed into the reference system by a transformation device 3, using the known stored transformation matrix $T^{RO}$), as well as its time derivative obtained via the differentiator 4. The unit vector $e_R$ is furthermore fed into the module 5 for the spin determination and the module 6 for the position determination.

The unity vector $e_B$ is determined with the aid of a sensor 9 (for example, an earth sensor or magnetometer) and fed to the modules for longitudinal rate determination 2, spin determination 5, as well as for the position determination 6. Furthermore, the time derivative of $e_B$ obtained via a differentiator 7 is fed to the two initially mentioned modules 5,6.

The spin vector $h_w$ for the spin wheels (not shown) is obtained from measurement signals of a measuring device 10, and is fed into the modules for longitudinal rate determination 2 and spin determination 5. The longitudinal rate c determined in module 2 is fed to the module for spin determination 5, whose result $h_B$, is then fed to the module for the position determination 6, and to a reference model module 8 for the orbital spin. Moreover, estimated values $\hat{t}$ of external disturbance moments are fed to the reference model module 8.

The result vector of the reference model module 8, $\hat{h}_0$, is fed back to the longitudinal rate determination module 2, and transformed into the reference system (not shown) through the module 3, and the result (the overall spin vector $h_R$ in the reference coordinates system) is fed to the module 6 for position determination. The latter module finally determines in accordance with the above-mentioned method the transformation matrix $T^{BR}$ describing the satellite position based on the two vector pairs $e_B$, $e_R$, $h_B$, $h_R$ fed thereto. This transformation matrix describes the transformation between the body-fixed coordinate system and the reference coordinate system. This transformation matrix likewise describes the deviation of the overall spin from the reference overall spin.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. An arrangement for determining the position of a spacecraft comprising the following components:
   means for measuring a first unit vector as a direction vector, in a body-fixed coordinate system;
   means for determining a path position of the spacecraft;
   means for determining a second unit vector as a reference direction vector in a reference coordinate system, based on the path position of the spacecraft and an orbit model;
   means for determining an overall spin vector in the body-fixed coordinate system, as a third vector;
   means for determining a reference overall spin vector of the spacecraft in the reference coordinate system by time propagation of known initial values of the overall spin of the spacecraft, as a fourth vector; and
   means for determining the position of the spacecraft based on the first through fourth vectors.

2. The arrangement of claim 1, further comprising a device for determining the longitudinal component of the speed of rotation in the direction of the direction vector between the body-fixed coordinate system and the reference coordinate system.

3. The arrangement of claim 1, further comprising a device for determining a spin vector of spin wheels of the spacecraft.

4. The arrangement of claim 2, further comprising a device for determining a spin vector of spin wheels of the spacecraft.

* * * * *